(12) United States Patent
Jefferies et al.

(10) Patent No.: US 6,616,188 B1
(45) Date of Patent: Sep. 9, 2003

(54) CABLE TENSIONED ROCK GUARD FOR A TRAILER

(76) Inventors: Stephen Jefferies, 180 Marion Drive, Sherwood Park, Alberta (CA), T8A 0M5; Colin McCaffrey, 105 Woodbine Road, Sherwood Park, Alberta (CA), T8A 4A5

( * ) Notice: Subject to any disclaimer, the term of this patent is extended or adjusted under 35 U.S.C. 154(b) by 0 days.

(21) Appl. No.: 09/657,048

(22) Filed: Sep. 1, 2000

(51) Int. Cl.[7] .............................................. B62D 25/16
(52) U.S. Cl. .................. 280/847; 280/152.3; 296/180.4
(58) Field of Search ........................... 280/152.3, 154, 280/768, 770, 847, 848, 155, 414.1; 180/68.6; 296/91, 180.4, 181

(56) References Cited

U.S. PATENT DOCUMENTS

| | | | | |
|---|---|---|---|---|
| 335,646 A | * | 2/1886 | Sniffen ......................... 280/155 |
| 624,713 A | * | 5/1899 | Warner ......................... 280/155 |
| 2,034,493 A | * | 3/1936 | Sonnenberg ................. 293/41 |
| 2,198,123 A | * | 4/1940 | McCoy ..................... 160/84.06 |
| 3,563,594 A | | 2/1971 | London ......................... 293/1 |
| 3,746,366 A | | 7/1973 | Bruce et al. ............. 280/154.5 |
| 3,831,696 A | * | 8/1974 | Mittendorf et al. ........ 180/68.6 |
| 4,075,723 A | * | 2/1978 | Bareis et al. ................ 114/361 |
| 4,141,580 A | | 2/1979 | Ivan ............................... 296/1 |
| 4,157,200 A | | 6/1979 | Johnson .......................... 296/1 |
| 4,567,628 A | * | 2/1986 | Prete, Jr. et al. .......... 24/68 CD |
| 4,657,062 A | * | 4/1987 | Tuerk ........................ 160/243 |
| 4,691,957 A | * | 9/1987 | Ellingson ..................... 296/98 |
| 4,706,991 A | | 11/1987 | Miller ......................... 280/770 |
| 4,840,400 A | | 6/1989 | Greenleaf .................... 280/770 |
| 4,928,477 A | | 5/1990 | Kalitzki et al. ................ 57/416 |
| 4,936,599 A | | 6/1990 | McNamee ................... 280/770 |
| 5,076,195 A | * | 12/1991 | Heyne ......................... 114/361 |
| 5,181,734 A | | 1/1993 | Brown ..................... 280/414.1 |
| 5,290,618 A | * | 3/1994 | Olson et al. ................. 428/100 |
| 5,480,174 A | | 1/1996 | Grenier .................... 280/414.1 |
| 5,487,586 A | | 1/1996 | Kinkaide .................. 296/180.1 |
| 5,488,981 A | | 2/1996 | Burkhart ..................... 150/166 |
| 5,538,315 A | | 7/1996 | Dixon ....................... 296/180.4 |
| 5,558,486 A | | 9/1996 | Paproski ..................... 414/537 |
| 5,829,775 A | | 11/1998 | Maxwell et al. ............ 280/507 |
| 5,899,166 A | * | 5/1999 | Alexander et al. .......... 114/361 |
| 6,109,639 A | * | 8/2000 | Blassingame et al. ... 280/414.1 |
| 6,135,685 A | * | 10/2000 | Anthony et al. ............ 410/100 |
| 6,196,587 B1 | * | 3/2001 | Sage .......................... 280/770 |

OTHER PUBLICATIONS

Bow Buddy, Ultimate Rock and Gravel Guard, Publication date May 7, 1998.*
"SWS Deflect–Away".*
Central Awning and Tarp, EZ Off Tarp Brackets for Chip Trailers.*
Inland Tarp and Cover, Inc., Hay tarps.*

* cited by examiner

*Primary Examiner*—Brian L. Johnson
*Assistant Examiner*—Christopher Bottorff
(74) *Attorney, Agent, or Firm*—Christensen O'Connor Johnson Kindness PLLC

(57) ABSTRACT

A method and apparatus for guarding a cargo on a trailer without a peripheral sidewall against rock damage. The method involves tensioning a sheet of flexible non-supporting material to form a protective shield.

17 Claims, 9 Drawing Sheets

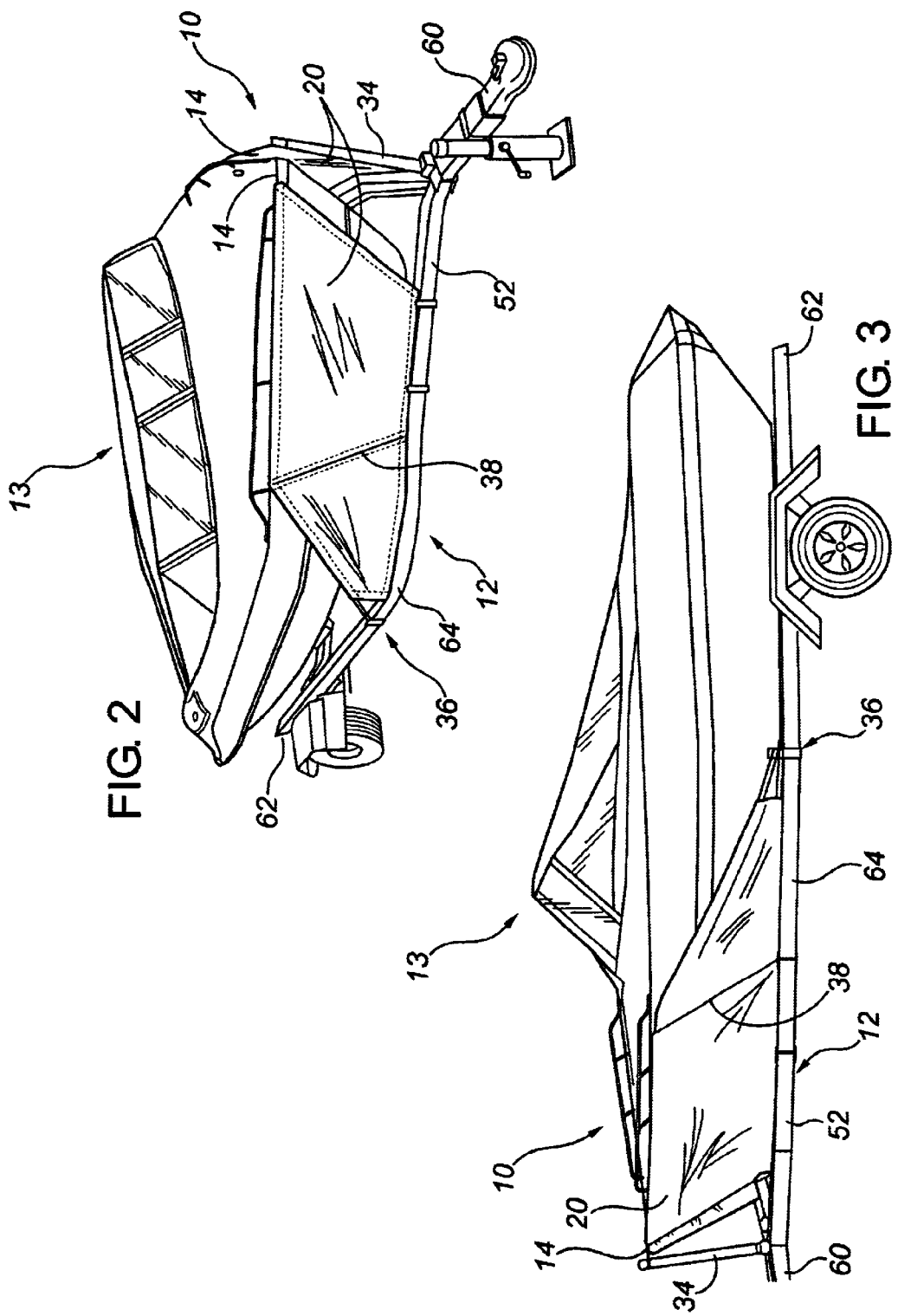

CABLE TENSIONED ROCK GUARD FOR A TRAILER

FIELD OF THE INVENTION

The present invention relates to a method for guarding a cargo on a trailer without a peripheral sidewall against rock damage and a rock guard for a trailer constructed in accordance with the teachings of the method.

BACKGROUND OF THE INVENTION

As a trailer is pulled along a road by a tow vehicle, rocks invariably are thrown up from the road surface. The rocks may originate from passing vehicles, or may originate from the tow vehicle. Some trailers have a peripheral sidewall that protects the cargo on the trailer from rock damage. With trailers that do not have a peripheral sidewall, the cargo is exposed and can sustain rock damage. For that reason, rock guards have been developed that mount onto trailers in order to protect cargo from rock damage. These rock guards are commonly positioned on trailers used to haul boats, motor vehicles, and snow mobiles; to name just a few of many applications.

SUMMARY OF THE INVENTION

The present invention relates to a method for guarding a cargo on a trailer without a peripheral sidewall against rock damage and a rock guard for a trailer constructed in accordance with the teachings of the method.

According to one aspect of the present invention there is provided a method of guarding a cargo on a trailer without a peripheral sidewall against rock damage. The method involves tensioning a sheet of flexible non-supporting material to form a protective shield.

According to another aspect of the present invention there is provided a rock guard for a trailer which is constructed in accordance with the teachings of the method. The rock guard includes at least one tensioning cable and at least one sheet of flexible non-supporting material having sufficient tensile strength to withstand tensioning. The sheet of material has means for accommodating the tensioning cable. At least one support member is provided having a first end and a second end. The first end is adapted to receive the tensioning cable. The second end is adapted for attachment to a trailer frame. At least one cable tensioning member is provided, whereby the sheet of material is tensioned with the tensioning cable to form a protective shield.

The invention, as described, involves tensioning a sheet of non-supporting material and positioning the sheet on a trailer to provide protection to the cargo from any rocks or debris rising from the road or the wheels of the towing vehicle.

Although beneficial results may be obtained through the use of the rock guard, as described above, it is desirable that the sheet of material be shaped to match the contours of the trailer. Even more beneficial results may, therefore, be obtained when at least one secondary support member is provided. The secondary supports help the sheet of material maintain a desired shape. Each secondary support has a first end and a second end. The first end is adapted to receive the tensioning cable. The second end is adapted for attachment to a trailer frame. It assists in promoting the desired shaping of the protective shield when the secondary support member is in an angularly offset orientation.

Although beneficial results may be obtained through the use of the invention, as described above, boat trailers have a front mounted winch that is used to pull a boat out of the water and onto the trailer. It is, therefore, preferable that the protective shield be removable in order to allow unfettered access to the front of the trailer when launching or recovering the boat. Even more beneficial results may, therefore, be obtained when the second end of each support member has a detachable trailer frame attachment bracket. This allows the attachment bracket to be attached to the trailer frame, and the support member to be attached to and detached from the attachment bracket, as required. For this purpose it is preferred that the attachment bracket have a male coupling and the support member a female coupling. It has been found that it is most convenient when the secondary support members are positioned in pockets in the sheet of material. The tensioning cable can be extended through an aperture at the first end of the secondary support member to prevent the secondary support member from being withdrawn from the pocket in the sheet of material.

There are various cable tensioning mechanisms that can be used with the rock guard, as descried above. Beneficial results have been obtained through the use of a cable tensioning member that has a pivotally mounting cam member. The tensioning cable can be tensioned by moving the cam member about a pivot.

Although beneficial results may be obtained through the use of the invention, as described above, even more beneficial results can be obtained when the sheet of non-supporting material has a plurality of secondary attachment straps by which an edge of the sheet adjacent the frame of the trailer can be secured to the trailer, whereby the non-supporting material can be tensioned between the straps and the tensioning cable.

Although beneficial results may be obtained through the use of the invention, as described above, even more beneficial results can be obtained when the sheet of non-supporting material is divided into two sheets of non-supporting material, each of the two sheets being a mirror image of the other, one of the two sheets being securable at one side of the trailer and another of the two sheets being securable at another side of the trailer, the two sheets thereby severing to protect a load on the trailer from rock chips. The two sheets allow more ready access to the primary support member without reducing the level of protection afforded by the invention.

Although beneficial results may be obtained through the use of the invention, as described above, even more beneficial results can be obtained when the tensioning cable has a first end and a second end, both of the first end and the second end having attachment loops by which the tensioning cable is detachably securable to each of the support member and one of the cable tensioning members.

BRIEF DESCRIPTION OF THE DRAWINGS

These and other features of the invention will become more apparent from the following description in which reference is made to the appended drawings, wherein:

FIG. 2 is a perspective view of the rock guard for a trailer illustrated in FIG. 1, mounted on a trailer carrying a boat.

FIG. 3 is a side elevation view of the rock guard for a trailer mounted on a trailer carrying a boat illustrated in FIG. 2.

DETAILED DESCRIPTION OF THE PREFERRED EMBODIMENT

Figure 1:
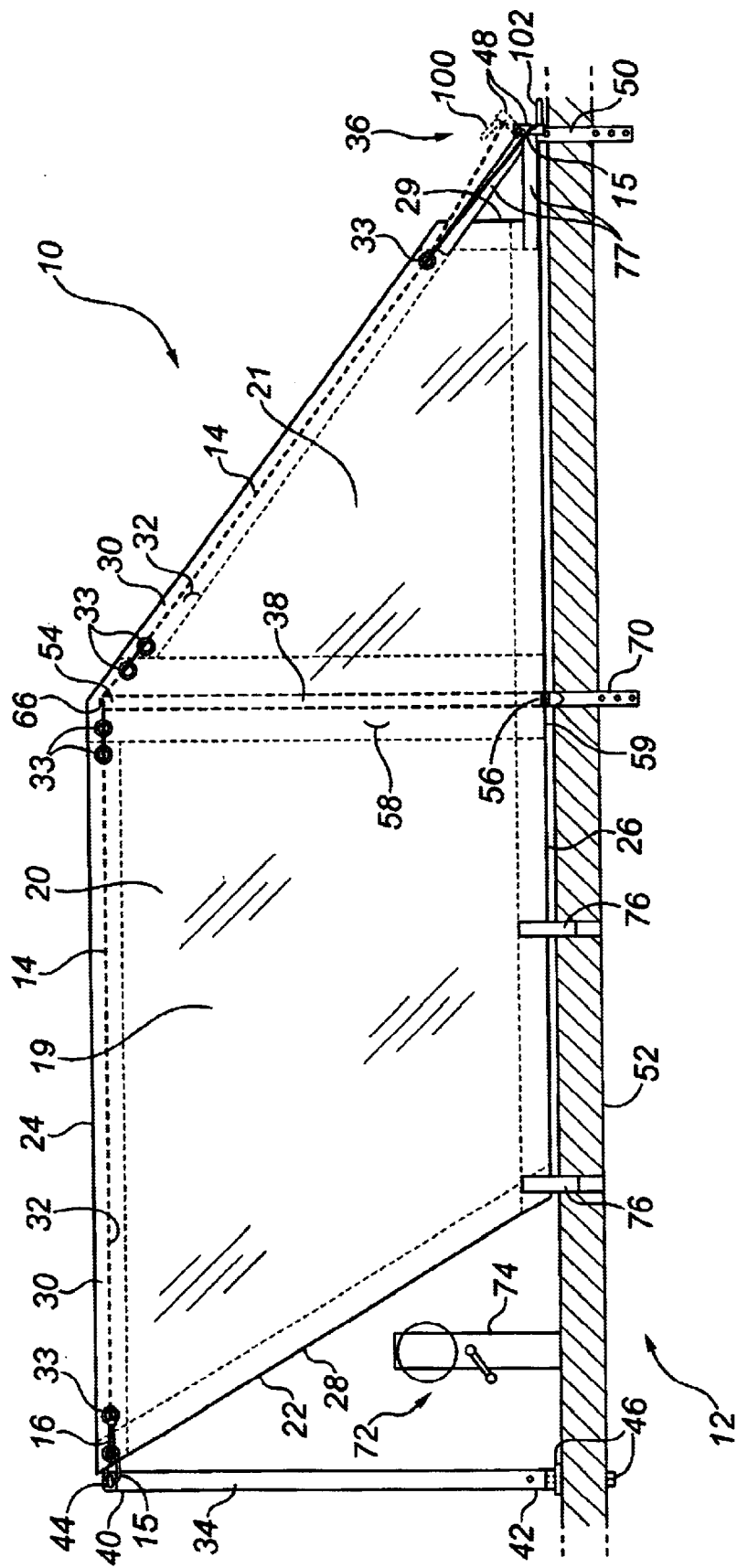
FIG. 1 is side elevation view of a rock guard for a trailer constructed in accordance with the teachings of the present invention, mounted on a trailer.

The preferred embodiment, a rock guard for a trailer generally identified by reference numeral 10, will now be described with reference to FIGS. 1 through 13.

Referring to FIGS. 2 and 3, rock guard 10 is mountable on a trailer 12 that does not have an enclosed peripheral sidewall, such as is used to transport a boat 13. Trailer 12 has a hitch end 60, a loading end 62, and a pair of opposed sides 64. A preferred embodiment of rock guard 10 includes a pair of tensioning cables 14, a pair of sheets of non-supporting material 20, each of pair of sheets 20 being a mirror image of the other, a primary support member 34, a pair of cable tensioning members 36, and a pair of secondary support members 38.

Referring to FIG. 1, each tensioning cable 14 has an attachment loop 15 at each of a first end 16 and a second end 18. Each of pair of sheets 20 has sufficient tensile strength to withstand tensioning. Each of pair of sheets 20 has a first portion 19, a second portion 21 and a peripheral edge 22. Peripheral edge 22 has a first portion 24, a second portion 26, a third portion 28, and a fourth portion 29. First portion 24 of peripheral edge 22 has a cable sleeve 30 with a channel 32 for accommodating tensioning cable 14. Cable 14 emerges from channel 32 through eyelets 33.

Figure 4:
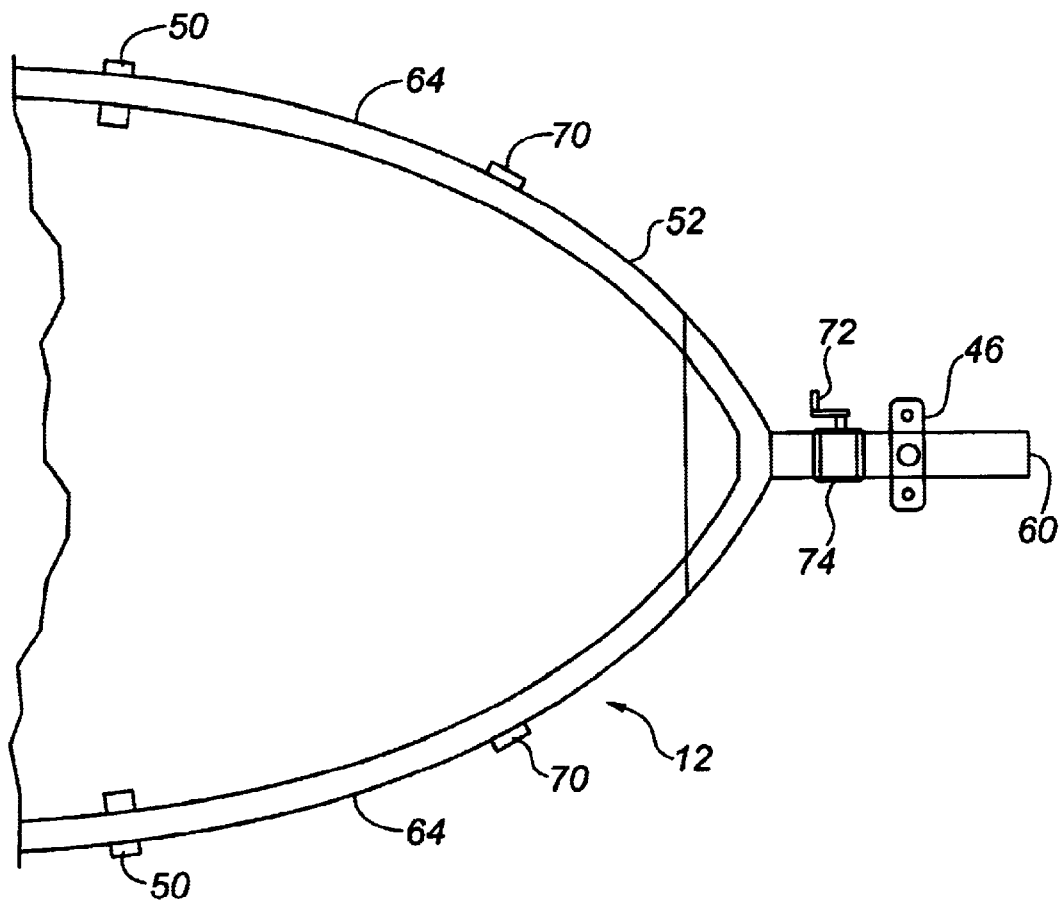
FIG. 4 is a top plan view of the front of trailer on to which is mounted the rock guard for a trailer illustrated in FIG. 1.
Figure 7:
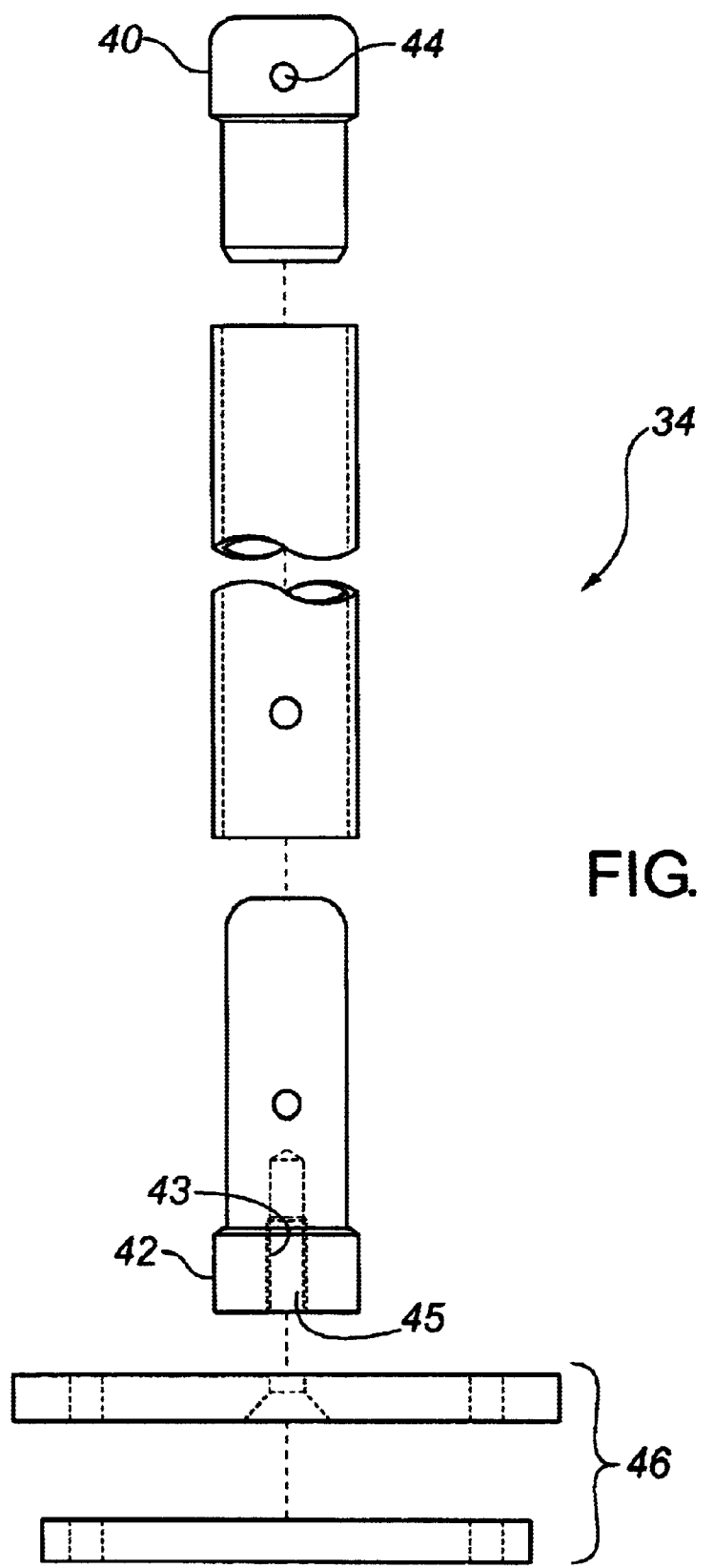
FIG. 7 is an exploded side elevation view of the primary support member for the rock guard for a trailer shown in FIG. 1.
Figure 9:
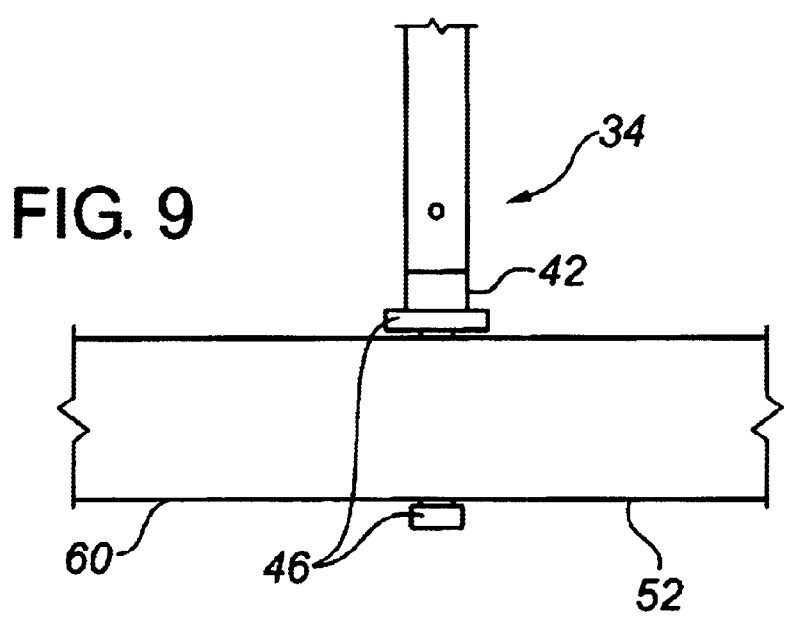
FIG. 9 is a detailed side elevation view of the primary support member for the rock guard for a trailer shown in FIG. 1, mounted on the frame of a trailer.
Figure 10:
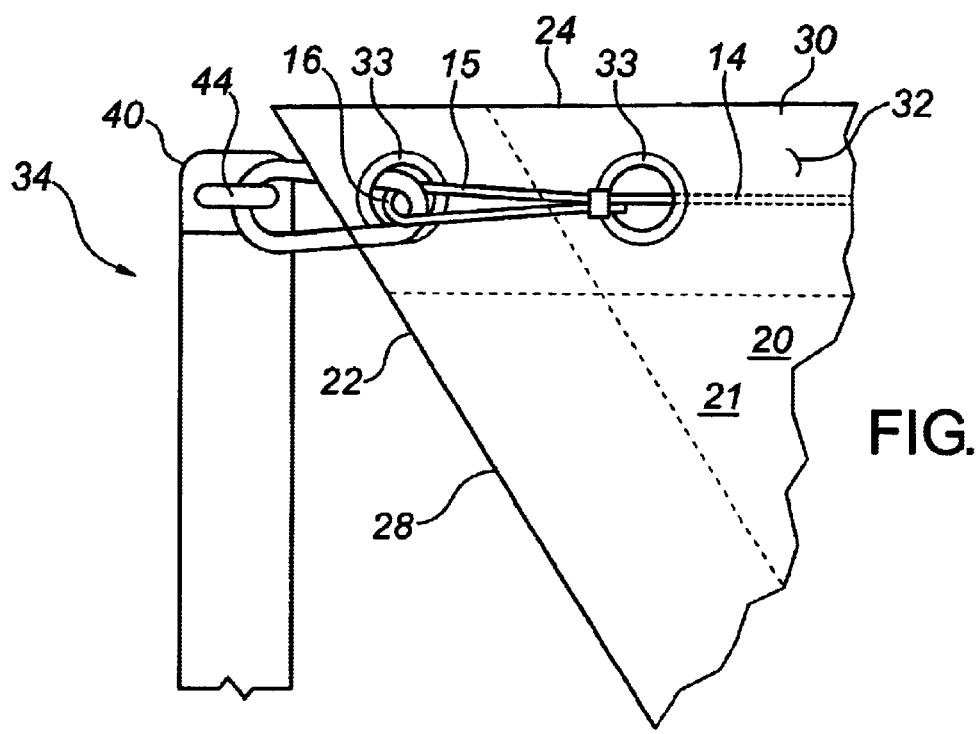
FIG. 10 is a detailed side elevation view of a tensioning cable secured to the first end of the primary support member for the rock guard for a trailer shown in FIG. 1.

Primary support member 34 has a first end 40 and a second end 42. Referring to FIG. 10, first end 40 of primary support member 34 has an hook attachment 44 for loop 15 at first end 16 of tensioning cable 14. Referring to FIG. 7, second end 42 of primary support member 34 is in the form of a female coupling 43 which detachably receives a male member 45 of a primary trailer frame attachment bracket 46. Referring to FIG. 9, attachment bracket 46 is secured to a frame 52 at hitch end 60 of trailer 12 in a male-female engagement. Referring to FIG. 4, primary attachment bracket 46 is positioned on frame 52 between hitch end 60 and a winch 72 secured by a post 74 to frame 52. Winch 72 is used for loading boat 13 on to trailer 12, as illustrated in FIGS. 2 and 3.

Figure 6:
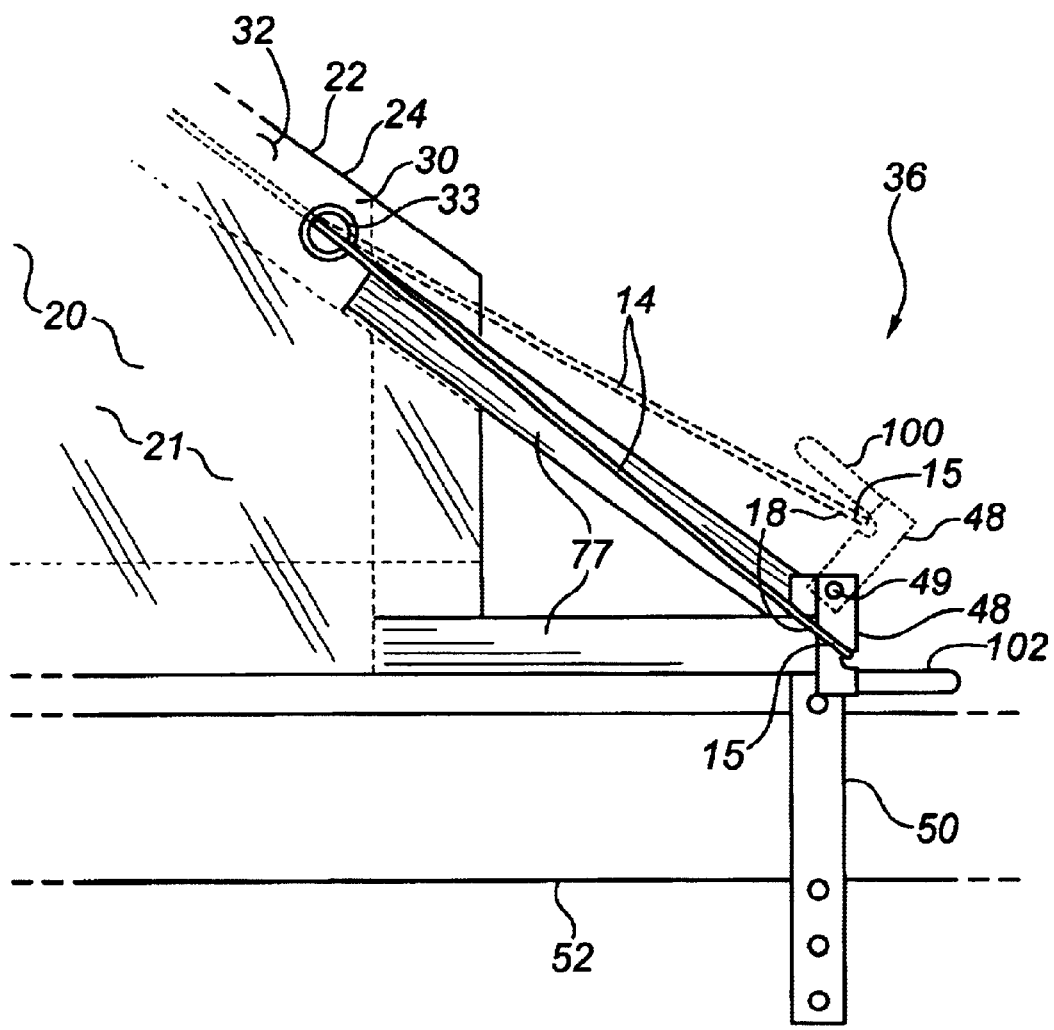
FIG. 6 is a side elevation view of one cable tensioning member for a rock guard for a trailer illustrated in FIG. 1, secured to a trailer.
Figures 12, 13:
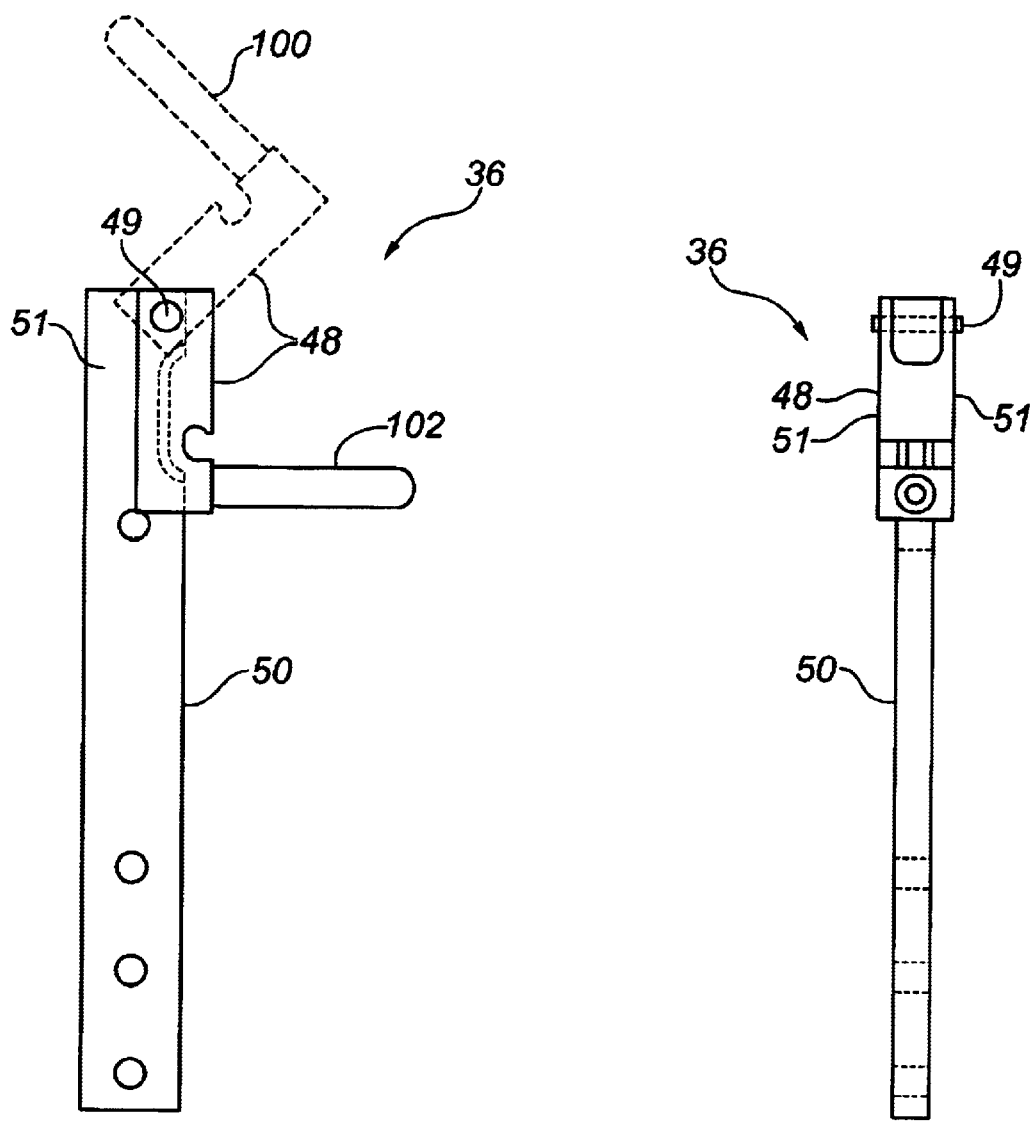
FIG. 12 is a detailed side elevation view of a cable tensioning member for the rock guard for a trailer shown in FIG. 1.
FIG. 13 is an end elevation view of the cable tensioning member illustrated in FIG. 12, in the secured position.

Referring to FIGS. 12 and 13, each cable tensioning member 36 has a detachable cam 48 pivotally mounted by a pivot rod 49 extending from each of opposed sides 51 of cam 48 to a cam support 50. Referring to FIG. 6, cam support 50 is secured to frame 52 at one of opposed sides 64 of trailer 12. Referring to FIG. 12, cam 48 is pivotally moveable between a released position, shown as dotted lines 100, and a tensioned position, shown as solid lines 102. Referring to FIG. 1, when cam 48 is in the released position 100, cable 14 is not tensioned, and first end 16 of cable 14 is releasable from primary support member 34. When cam 48 is in the tensioned position 102, cable 14 is securely tensioned between cable tensioning member 36 and primary support member 34.

Figure 5:
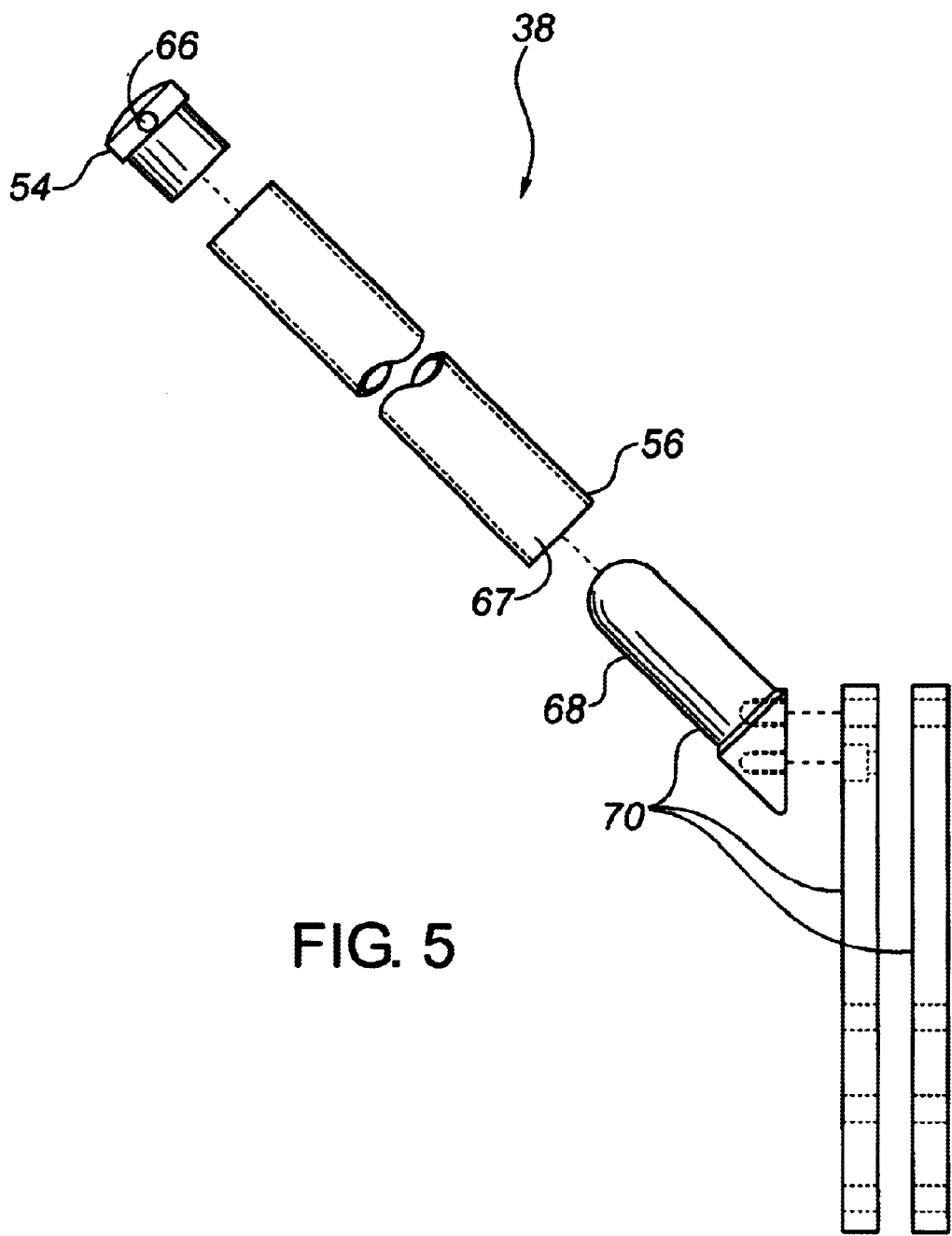
FIG. 5 is an exploded side elevation view of a male support member for supporting a female support member at a side of the rock guard for a trailer illustrated in FIG. 1, mounted to a side of a trailer.
Figure 8:
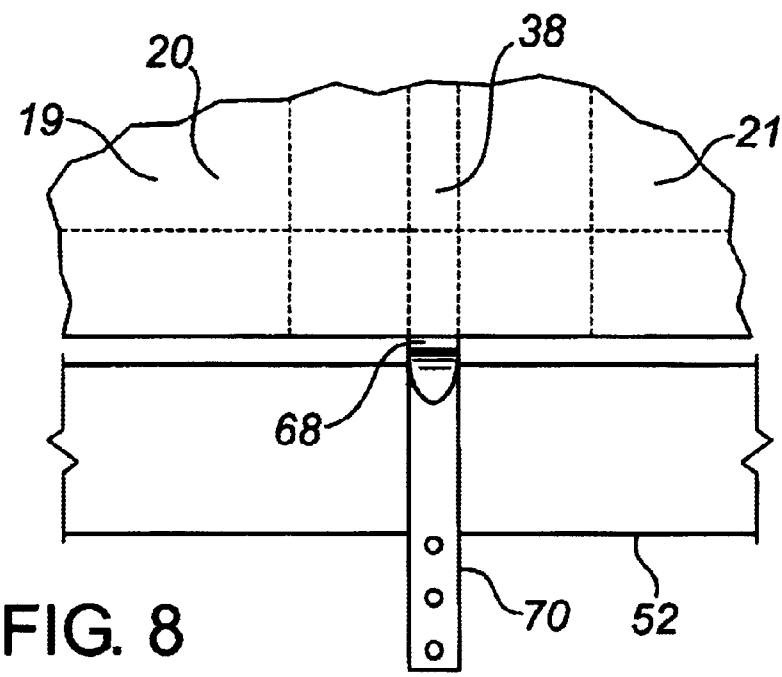
FIG. 8 is a side elevation view of a strap securing the rock guard for a trailer mounted on a trailer to the frame of a trailer as shown in FIG. 1.
Figure 11:
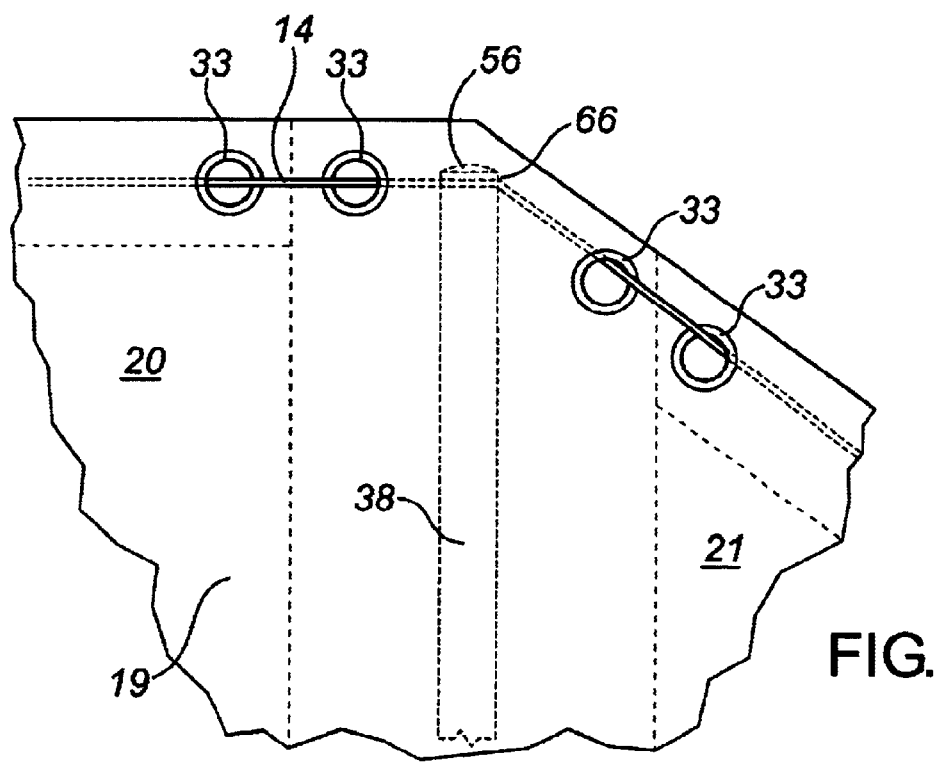
FIG. 11 is a detailed side elevation view of a tensioning cable secured to the first end of a secondary support member for the rock guard for a trailer shown in FIG. 1.

Referring to FIG. 5, each secondary support member 38 has a first end 54 and a second end 56. Referring to FIG. 1, each secondary support member 38 is housed within a sleeve or pocket 58. Pocket 58 has an opening 59 adjacent second portion 26 of peripheral edge 22 of sheet 20 from which second end 56 of secondary support member 38 extends. Referring to FIG. 11, cable 14 passes through a passage 66 at first end 54 of each secondary support 38. Referring to FIG. 5, second end 56 of secondary support member 38 is in the form of a female coupling 67 that detachably receives in a male-female engagement a male member 68 of a secondary trailer frame attachment bracket 70. Referring to FIGS. 1 and 8, secondary trailer frame attachment bracket 70 is secured to frame 52 at one of opposed sides 64 of trailer 12. When secondary trailer frame attachment bracket 70 is secured to frame 52, male member 68 is outwardly inclined, thereby affecting the orientation of secondary support member 38.

First straps 76 are secured to second edge 26 adjacent third edge 28 of one of pair of sheets 20. First straps 76 extend under frame 52 of trailer 12 and are detachably securable to second edge 26 of another of pair of sheets 20, thereby tensioning second edge 26 of each of pair of sheets 20. Second straps 77 extend from fourth portion 29 adjacent each of first portion 24 and second portion 26 of peripheral edge 22 of each of sheets 20. Second straps 77 loop around cam support 50 to tension second portion 21 of sheets 20 between cam support 50 and secondary support member 38.

The method of use of rock guard 10 will not be described with reference to FIGS. 1 through 13. Rock guard 10 as described above is provided. Referring to FIG. 4, primary trailer frame attachment bracket 46 is secured at hitch end 60 of trailer 12. One each of secondary trailer frame attachment brackets 70 and cam support 50 are secured to frame 52 at each of opposed sides 64 of trailer 12. Winch 72, illustrated in FIG. 1, is used to load boat 13 onto trailer 12. When boat 13 is secured in place on trailer 12, as illustrated in FIGS. 2 and 3, second end 42 of primary support member 34 is mounted on male member 45 of trailer frame attachment bracket 46, illustrated in FIG. 7. Second end 54 of each of secondary supports 38 carrying one each of cables 14 and sheets 20 is mounted on one of outwardly inclined trailer frame attachment brackets 70, illustrated in FIG. 5. Referring to FIG. 1, each of sheets 20 is extended between primary support member 34 and cable tensioning member 36. Loop 15 at first end 16 of each of cables 14 is secured to first end 40 of primary support member 34 as illustrated in FIG. 10. First straps 76 are secured under frame 52 of trailer 12 between second edges 26 of each of sheets 20 as illustrated in FIG. 1. Referring to FIG. 6, each of cams 48 is mounted on one of cam supports 50. Second straps 77 are looped about cam support 50. Loop 15 at second end 18 of cable 14 engages cam 48 of cable tensioning member 36 as illustrated in FIG. 6. Cam 48 moves pivotally to tension cable 14 between cable tensioning member 36 and primary support member 34. Referring to FIG. 1, tensioned cable 14 maintains first edge 24 of sheet 20 in a taught and elevated position, and prevents secondary support 38 from inadvertently detaching from secondary trailer frame attachment bracket 70. Rock guard 10 so installed prevents rocks or other debris from striking boat 13 while trailer 12 is being towed.

The method of unloading boat 13 from trailer 12 and storing rock guard 10 will now be described. Cam 48 is moved pivotally to release tension in cable 14. Loops 15 are detached from primary support member 34 and tensioning member 36. Straps 76 are detached from second edges 26 of each of sheets 20. Primary support member 34 is detached from primary trailer frame attachment bracket 46 and secondary support members 38 are each detached from secondary trailer frame attachment brackets 70. Rock guard 10 is then out of the way as boat 13 is unloaded from trailer 12. Sheets 20 containing secondary support members 38 can then be rolled up into a small bundle and stored with primary support member 34 and cams 48 and stored in a storage bag.

It will be apparent to one skilled in the art that modifications may be made to the illustrated embodiment without departing from the spirit and scope of the invention as hereinafter defined in the claims.

The Embodiments of the Invention in which an Exclusive Property or Privilege is claimed are defined as follows:

1. A rock guard for a trailer, comprising:
    at least one tensioning cable having a first end and a second end;
    at least one sheet of flexible non-supporting material having sufficient tensile strength in withstand tensioning, the sheet of material having a peripheral edge with a channel for accommodating the at least one tensioning cable;
    at least one support member having a first end and a second end, the first end having an attachment for securing the first end of the at least one tensioning cable and the second end having a detachable trailer frame attachment bracket adapted for attachment to a trailer frame; and
    at least one mechanical cable tensioning member capable of exerting a force upon the second end of the tensioning cable to mechanically move the tensioning cable from a non-tensioned position to a tensioned position when the tensioning cable extends through the channel along the peripheral edge of the sheet of material, whereby the sheet of material is selectively tensioned with the tensioning cable to form a protective shield.

2. The rock guard for a trailer as defined in claim 1, wherein at least one secondary support member is provided having a first end and a second end, the secondary support member supporting the sheet of material, the first end being adapted to receive the at least one tensioning cable and the second end being adapted for attachment to a trailer frame.

3. The rock guard for a trailer as defined in claim 2, wherein the at last one secondary support member is positioned in a pocket in the sheet of material.

4. The rock guard for a trailer as defined in claim 3, wherein the at least one tensioning cable extends through an aperture at the first end of the secondary support member, thereby preventing the secondary support member from being withdrawn from the pocket in the sheet of material.

5. The rock guard as defined in claim 1, wherein one of the second end of the at least one support member and the detachable trailer frame attachment bracket has a male coupling and the other of the second end of the support member and the detachable trailer frame attachment bracket has a female coupling.

6. The rock guard for a trailer as defined in claim 2, wherein the second end of the secondary support member has a secondary detachable trailer frame attachment bracket, the secondary detachable trailer frame attachment bracket supporting the secondary support member in an angularly offset orientation.

7. The rock guard for a trailer as defined in claim 1, wherein the cable tensioning member has a pivotally mounted cam member having a first position in which the cable is tensioned and a second position in which the tension in the cable is released.

8. The rock guard for a trailer as defined in claim 1, wherein the sheet of material has a plurality of frame attachment straps.

9. The rock guard for a trailer as defined in claim 1, wherein the tensioning cable has a first end and a second end, both of the first end and the second end having attachment loops.

10. A rock guard for a trailer, comprising:
    a pair of tensioning cables, each having a first end and a second end, both the first end and the second end having attachment loops;
    a sheet of flexible non-supporting material having sufficient tensile strength to withstand tensioning, the sheet of material having a peripheral edge with a channel for accommodating the pair of tensioning cables and a plurality of frame attachment straps;
    a primary support member having a first end and a second end, the first end having an attachment for securing the first end of each of the pair of tensioning cables and the second end being adapted for attachment to a trailer frame;
    a pair of secondary support members, each having a first end and a second end, the first end being adapted to receive one of the tensioning cables and the second end being adapted for attachment to a trailer frame in an angularly offset orientation, each secondary support member being positioned in a pocket in the sheet of material; and
    mechanical cable tensioning members capable of exerting a force upon the second end of each of the tensioning cables to mechanically move the tensioning cables from a non-tensioned position to a tensioned position when the tensioning cables extend through the channel along the peripheral edge of the sheet of material, whereby the sheet of material is selectively tensioned with the pair of tensioning cables to form a protective shield.

11. The rock guard for a trailer as defined in claim 10, wherein the second end of the primary support member has a primary detachable trailer frame attachment bracket.

12. The rock guard for a trailer as defined in claim 10, wherein the second end of the secondary support member has a secondary detachable trailer frame attachment bracket, the secondary detachable trailer frame attachment bracket supporting the secondary support member in an angularly offset orientation.

13. The rock guard as defined in claim 11, wherein the second end of the primary support member has a female coupling and the primary detachable trailer frame attachment bracket has a male coupling.

14. The rock guard as defined in claim 12, wherein the second end of the secondary support member has a female coupling and the secondary detachable trailer frame attachment bracket has a male coupling.

15. The rock guard for a trailer as defined in claim 10, wherein the cable tensioning member has a pivotally mounted cam member having a first positioned in which the cable is tensioned and a second position in which the tension in the cable is released.

16. A rock guard for a trailer, comprising:
- a pair of tensioning cables, each having a first end and a second end, both the first end and the second end having attachment loops;
- a pair of sheets of flexible non-supporting material having sufficient tensile strength to withstand tensioning, each sheet of material having a peripheral channel which accommodates one of the tensioning cables and a plurality frame attachment straps;
- a primary trailer frame attachment bracket adapted for attachment to a trailer frame, the primary trailer frame attachment bracket having a male coupling;
- a primary support member having a first end and a second end, the first end having hooks to receive the attachment loop at the first end of each of the tensioning cables and the second end having a female coupling that mates with the male coupling on the primary trailer frame attachment bracket;
- a pair of secondary trailer frame attachment brackets adapted for attachment to a trailer frame, the secondary trailer frame attachment bracket having a male coupling, the male coupling being in an angularly offset orientation;
- a pair of secondary support members, each having a first end and a second end, the first end having an aperture through which is threaded one of the tensioning cables and the second end having a female coupling that mates with the male coupling on the secondary trailer frame attachment bracket whereby the secondary support members are secured to a trailer frame in an angularly offset orientation, each of the secondary support members being positioned in pockets in one of the sheets of material and precluded from removal by the tensioning cables threaded through the aperture; and
- a pair of cable tensioning members, whereby each of the sheets of material is tensioned with the tensioning cable to form a protective shield, the cable tensioning member having a pivotally mounted cam member with a first position in which the cable is tensioned and a second position in which the tension in the cable is released.

17. A rock guard for a trailer, comprising:
- a trailer having a frame with a forward end and a rearward end;
- an upstanding support member having a first end and a second end, the second end being secured to the frame at the forward end of the trailer;
- a sheet of flexible non-supporting material having sufficient tensile strength to withstand tensioning, the sheet of material having a peripheral edge with a channel;
- a mechanical cable tensioning member mounted to the frame of the trailer spaced from the forward end; and
- a tensioning cable having a first end and a second end, the tensioning cable being positioned in the channel along the peripheral edge of the sheet of material, the first end of the tensioning cable being secured to the support member and the second end of the tensioning cable being secured to the mechanical cable tensioning member, the mechanical cable tensioning member exerting a force upon the second end of the tensioning cable to mechanically move the tensioning cable from a non-tensioning position to a tensioned position, the sheet of material being selectively tensioned with the tensioning cable to form a protective shield.

* * * * *

UNITED STATES PATENT AND TRADEMARK OFFICE
CERTIFICATE OF CORRECTION

PATENT NO. : 6,616,188 B1
DATED : September 9, 2003
INVENTOR(S) : S. Jefferies et al.

It is certified that error appears in the above-identified patent and that said Letters Patent is hereby corrected as shown below:

Column 7,
Line 7, "first positioned" should read -- first position --
Line 19, "plurality frame" should read -- plurality of frame --

Column 8,
Line 36, "non-tensioning" should read -- non-tensioned --

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,616,188 B1
DATED : September 9, 2003
INVENTOR(S) : S. Jefferies et al.

It is certified that error appears in the above-identified patent and that said Letters Patent is hereby corrected as shown below:

<u>Title page,</u>
Item [30], Foreign Application Priority Data, insert in appropriate order
-- [30] Foreign Application Priority Data
Aug. 30, 1999 (CA)  2,281,142 --

Signed and Sealed this

Twenty-seventh Day of April, 2004

JON W. DUDAS
*Acting Director of the United States Patent and Trademark Office*